US009380175B2

(12) United States Patent
Shinagawa

(10) Patent No.: US 9,380,175 B2
(45) Date of Patent: Jun. 28, 2016

(54) IMAGE FORMING APPARATUS, CONTROL METHOD OF IMAGE FORMING APPARATUS, AND COMPUTER-READABLE STORAGE MEDIUM

(71) Applicant: CANON KABUSHIKI KAISHA, Tokyo (JP)

(72) Inventor: Kazutaka Shinagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/894,748

(22) Filed: May 15, 2013

(65) Prior Publication Data

US 2013/0308150 A1 Nov. 21, 2013

(30) Foreign Application Priority Data

May 17, 2012 (JP) ................................. 2012-113474

(51) Int. Cl.
*G06K 15/00* (2006.01)
*H04N 1/00* (2006.01)
*G06F 3/12* (2006.01)

(52) U.S. Cl.
CPC ....... *H04N 1/00209* (2013.01); *H04N 1/00212* (2013.01); *H04N 1/00217* (2013.01); *H04N 1/00891* (2013.01); *H04N 1/00925* (2013.01); *H04N 2201/0093* (2013.01); *H04N 2201/0094* (2013.01)

(58) Field of Classification Search
CPC ..................... H04N 1/00891; H04N 1/00925
See application file for complete search history.

(56) References Cited

U.S. PATENT DOCUMENTS

| 6,883,016 B1 * | 4/2005 | Fujii et al. ..................... 709/203 |
| 2006/0212528 A1 * | 9/2006 | Tonegawa ..................... 709/206 |
| 2011/0292446 A1 * | 12/2011 | Kojima ......................... 358/1.15 |
| 2013/0019116 A1 * | 1/2013 | Ochi ............................. 713/323 |

FOREIGN PATENT DOCUMENTS

JP 09-233238 A 9/1997

* cited by examiner

*Primary Examiner* — Dov Popovici
(74) *Attorney, Agent, or Firm* — Canon USA Inc. IP Division

(57) ABSTRACT

An image forming apparatus capable of communicating with an external apparatus includes a reception unit configured to receive E mail transmitted from the external apparatus, a printing unit configured to print the E mail received by the reception unit, a setting unit configured to set a reception function of the Email valid or invalid, and a control unit configured, in a case where it is determined that a factor for shifting a power state of the image forming apparatus to an OFF-state has been detected, to set the power state of the image forming apparatus to the OFF-state if the reception function of the E mail is set invalid by the setting unit, and not to set the power state of the image forming apparatus to the OFF-state if the reception function of the E mail is set valid by the setting unit.

15 Claims, 11 Drawing Sheets

FIG. 4

230 TRANSFER SETTING TABLE

| FAX NUMBER | TRANSFER DESTINATION IP ADDRESS | NUMBER OF TRANSFER RETRYING TIMES |
|---|---|---|
| 012-345-6789 | 111.222.333.444 | 30sec × 5 TIMES |
| 012-345-6788 | 111.222.333.555 | 30sec × 5 TIMES |
| 012-345-6787 | 111.222.333.666 | 30sec × 5 TIMES |

FIG. 5

```
Date: Wed, 11 May 2011 12:00:00 + 0900
From: MFP@canon.co.jp
To: SFP@canon.co.jp
Subject: FAX
Message-Id: <20110511120000@canon.co.jp >
MIME-Version: 1.0
Content-Type: multipart/mixed; boundary=" ------AAABBBCCCDDDEEE"
X-Canon-Fax: ON
```
— 700

```
------AAABBBCCCDDDEEE
Content-Type: Text/plain; charset="ISO-2022-JP"
Content-Transfer-Encoding: 7bit This is a sample of E-mail.
```
— 701

```
------AAABBBCCCDDDEEE
Content-Type: application/octer-stream; name="image1.tif"
Content-Transfer-Encoding: base64
Content-Disposition: attachment; filename="image1.tif"

[TIFF DATA]
```
— 702

```
------AAABBBCCCDDDEEE
Content-Type: application/octer-stream; name="image2.jpg"
Content-Transfer-Encoding: base64
Content-Disposition: attachment; filename="image2.jpg"

[JPEG DATA]

------AAABBBCCCDDDEEE
```
— 703

FIG. 6
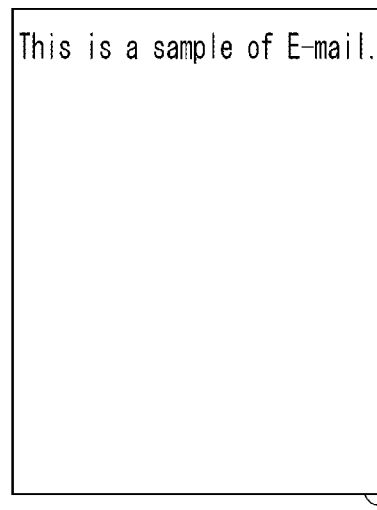
1ST PAGE
MAIL MESSAGE DOCUMENT
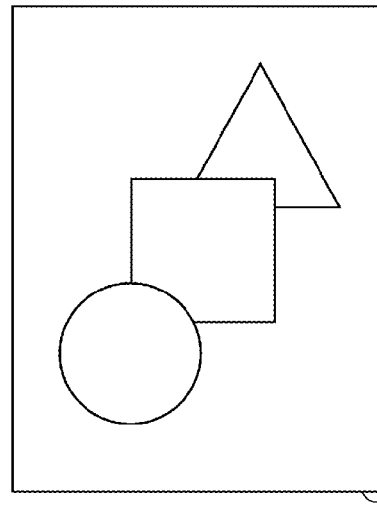
2ND PAGE
IMAGE FILE
image1.tif
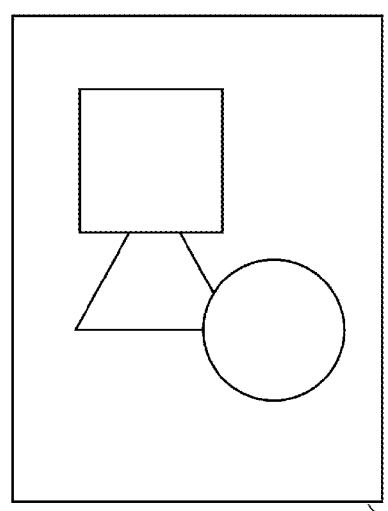
3RD PAGE
IMAGE FILE
image2.jpg

IMAGE FORMING APPARATUS, CONTROL METHOD OF IMAGE FORMING APPARATUS, AND COMPUTER-READABLE STORAGE MEDIUM

BACKGROUND OF THE INVENTION

1. Field of the Invention

The present invention relates to an image forming apparatus capable of communicating with an external apparatus that can transfer received FAX data, a control method of the image forming apparatus, a program, and a storage medium.

2. Description of the Related Art

To meet user's energy saving request, for the image forming apparatus, electricity regulation such as Energy-related Product (ErP) directive Lot 6 to be implemented in 2013 must be dealt with. The ErP makes environment consideration designing obligatory targeting all energy-related products. The Lot 6 defines regulation values of power consumption of a standby mode and power consumption of an OFF-mode.

To comply with the regulation values defined in the Lot 6, there has been offered an apparatus that has a function of turning OFF power for the image forming apparatus (hereinafter, auto shutdown function) if the image forming apparatus is not continuously used for a predetermined time.

According to Standard of the Lot 6, an apparatus having a FAX receiving function is excluded from the target apparatuses of the Lot 6 so that incoming data from the external apparatus can always be received. Accordingly, the apparatus having the FAX receiving function does not need to be equipped with the auto shutdown function.

There is known an image forming apparatus that can receive Email attached with FAX data from an Internet facsimile (discussed in Japanese Patent Application Laid-Open No. 09-233238). The image forming apparatus discussed in Japanese Patent Application Laid-Open No. 09-233238 receives, for example, Email attached with FAX data of a print paper size of A4 and printing resolution of 200 dots per inch (DPI) from the Internet facsimile to print it.

The image forming apparatus discussed in Japanese Patent Application Laid-Open No. 09-233238 that can receive the Email attached with the FAX data may not have a FAX receiving function because it receives the FAX data as the Email while it can receive the FAX data. In this case, the image forming apparatus is required to have the auto shutdown function since it is a target device of the Lot 6.

In terms of requirement for enabling reception of FAX data anytime, the same is true on both the FAX receiving function and the reception function of the Email attached with the FAX data. However, in a case where the image forming apparatus has a reception function of the Email attached with the FAX data while having no FAX receiving function, the auto shutdown function is executed. Then, the power of the image forming apparatus is turned OFF to disable the image forming apparatus to receive the Email attached with the FAX data.

SUMMARY OF THE INVENTION

The present invention is directed to an image forming apparatus capable of preventing power from automatically turning OFF if a function of receiving Email is valid.

According to an aspect of the present invention, an image forming apparatus capable of communicating with an external apparatus includes a reception unit configured to receive Email transmitted from the external apparatus, a printing unit configured to print the Email received by the reception unit, a setting unit configured to set a reception function of the Email valid or invalid, and a control unit configured, in a case where it is determined that a factor for shifting a power state of the image forming apparatus to an OFF-state has been detected, to set the power state of the image forming apparatus to the OFF-state if the reception function of the Email is set invalid by the setting unit, and not to set the power state of the image forming apparatus to the OFF-state if the reception function of the Email is set valid by the setting unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a transfer setting table stored in a nonvolatile memory of a multifunction peripheral (MFP).

FIG. 5 illustrates data of Email received by the SFP.

FIG. 6 illustrates a printing example of the Email by the SFP.

DESCRIPTION OF THE EMBODIMENTS

Various exemplary embodiments, features, and aspects of the invention will be described in detail below with reference to the drawings.

A first exemplary embodiment will be described.
System Configuration

Figure 1:
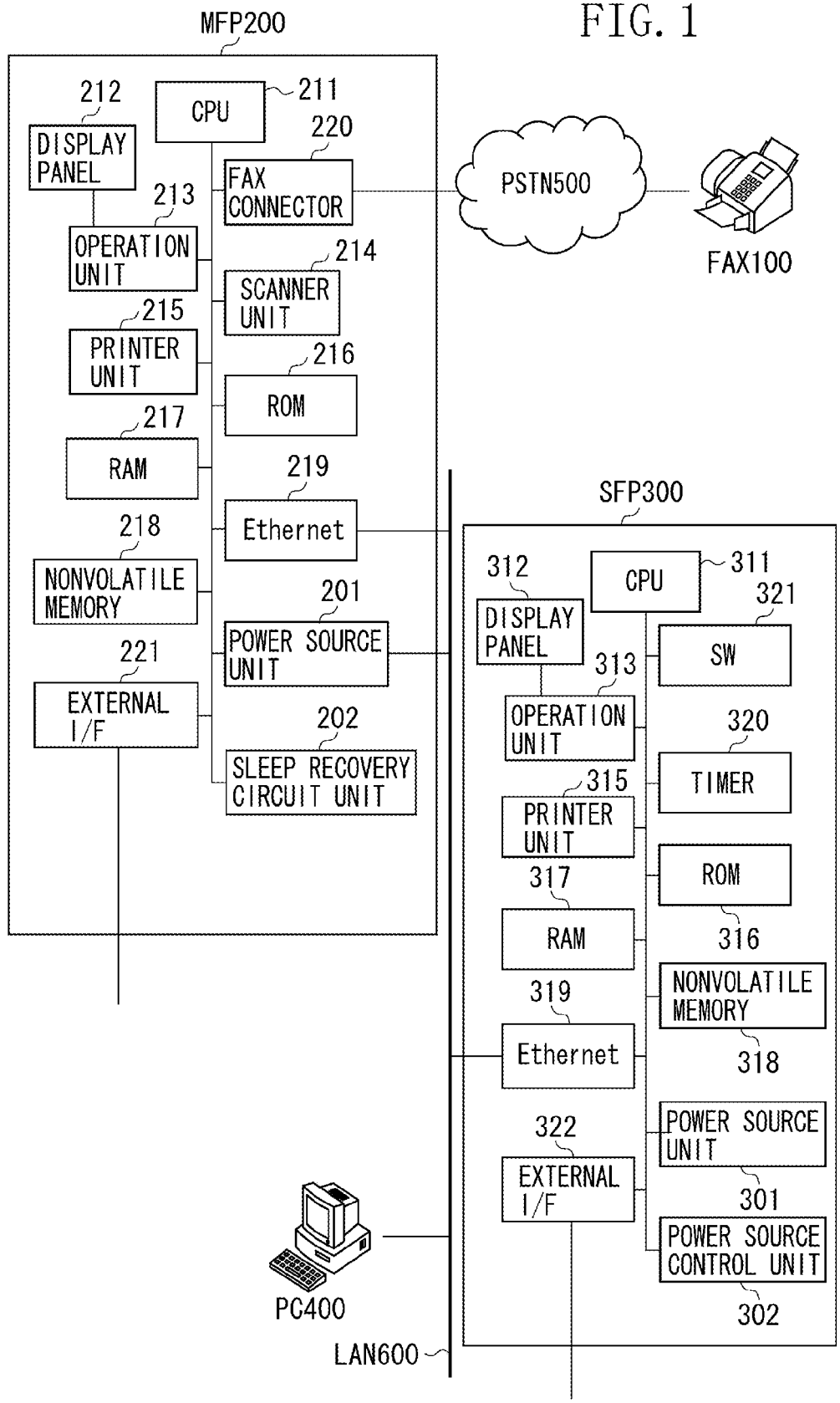
FIG. 1 is a block diagram illustrating a configuration of a printer, a host computer, and a printing system according to a first exemplary embodiment of the present invention.

FIG. 1 is a block diagram illustrating a configuration of a printing system according to the first exemplary embodiment of the present invention.

The printing system includes a facsimile (hereinafter, FAX) 100 that transmits FAX data (image data) according to a procedure of facsimile communication, and a MFP 200 that receives the transmitted FAX data. The printing system further includes a printer (SFP) 300 that receives Email transmitted from the MFP 200 to print it, and a personal computer (PC) 400.

The FAX 100 and the MFP 200 are communicably connected to each other via a public switched telephone networks (PSTN) 500. Other communication systems such as communication via other telephone networks or a digital line (ISDN:

integrated service digital network) may be employed in place of the PSTN. The MFP 200 is communicably connected to the SFP 300 via a local area network (LAN) 600.

The MFP 200 receives the FAX data transmitted from the FAX 100 to convert the FAX data into image data printable by the SFP 300. The MFP 200 attaches the converted image data to Email to transmit the Email to the SFP 300 via the LAN 600. Then, the SFP 300 receives the Email transmitted from the MFP 200 to print a mail message document of the Email and the attached image data.

The SFP 300 according to the present invention can not only receive the Email transmitted from the MFP 200 but also print page-description language (PDL) data transmitted from the PC 400.

Through the LAN 600, the MFP 200 and the SFP 300 communicate with each other according to transmission protocol up to a transport layer referred to as transmission control protocol/Internet protocol (TCP/IP). Further, through the LAN 600, the Email can be transferred between the MFP 200 and the SFP 300 according to communication protocol of an upper layer referred to as simple mail transfer protocol (SMTP).

Configuration of MFP 200

As illustrated in FIG. 1, the MFP 200 includes a power source unit 201, a sleep return circuit unit 202, a central processing unit (CPU) 211, a display panel 212, an operation unit 213, a scanner unit 214, a printer unit 215, a read-only memory (ROM) 216, a random access memory (RAM) 217, a nonvolatile memory 218, an Ethernet (registered trademark) interface (I/F) 219, a FAX connector 220, and an external I/F 221.

The power source unit 201 supplies power to the MFP 200. The sleep return circuit unit 202 detects, when the MFP 200 is in a sleep mode, a condition for recovering the MFP 200 from the sleep state, and instructs the power source unit 201 to resume suspended supplying of power.

The CPU 211 controls each unit of the MFP 200. The display panel 212 displays various pieces of information of the MFP 200. The operation unit 213 performs execution instruction of various programs according to a user's operation.

The scanner unit 214 reads a document, and converts an image of the document into image data. The printer unit 215 outputs the input image data to print the data.

The ROM 216 stores program codes for controlling the CPU 211, display panel 212, the operation unit 213, the scanner unit 214, and the printer unit 215. By employing a rewritable flash ROM as the ROM 216, the program codes stored in the ROM 216 can be updated. The RAM 217 is used as a work memory of the program codes. The RAM 217 temporarily stores an image to be printed by the printer unit 215.

The nonvolatile memory 218 temporarily stores the received FAX data. The nonvolatile memory 218 is configured with a hard disk (HDD) or a flash ROM.

The Ethernet(registered trademark) I/F 219 for connection to the LAN 600 enables transmission and reception of the Email or the PDL data. The FAX connector 220 for connection to the PSTN 500 enables transmission and reception of the FAX data from the FAX 100. The external I/F 221 is an interface with other external apparatuses.

Configuration of SFP 300

The SFP 300 includes a power source unit 301, a power source control unit 302, a CPU 311, a display panel 312, an operation unit 313, a printer unit 315, a ROM 316, a RAM 237, a nonvolatile memory 318, an Ethernet (registered trademark) I/F 319, a timer 320, and an external I/F 322.

The power source unit 301 supplies power to the SFP 300. A configuration of the power source unit 301 will be described in detail below.

The power source control unit 302 controls the power source unit 301 to control power supplied to each device of the SFP 300. If the SFP 300 is in a standby state, the power source control unit 302 controls the power source unit 301 so that power can be supplied to each unit such as the controller unit 310 (see FIG. 2), the printer unit 315, or the operation unit 313. When the SFP 300 is in a sleep state, the power source control unit 302 controls the power source unit 301 so that power can be supplied to the controller unit 310. In this case, power is supplied to neither of the printer unit 315 and the operation unit 313. When power of the SFP 300 is turned OFF by the auto shutdown function or the weekly shutdown function, the power source control unit 302 controls the power source unit 301 to stop supplying of power to each unit of the SFP 300.

If the power source control unit 302 returns the

Figure 2:
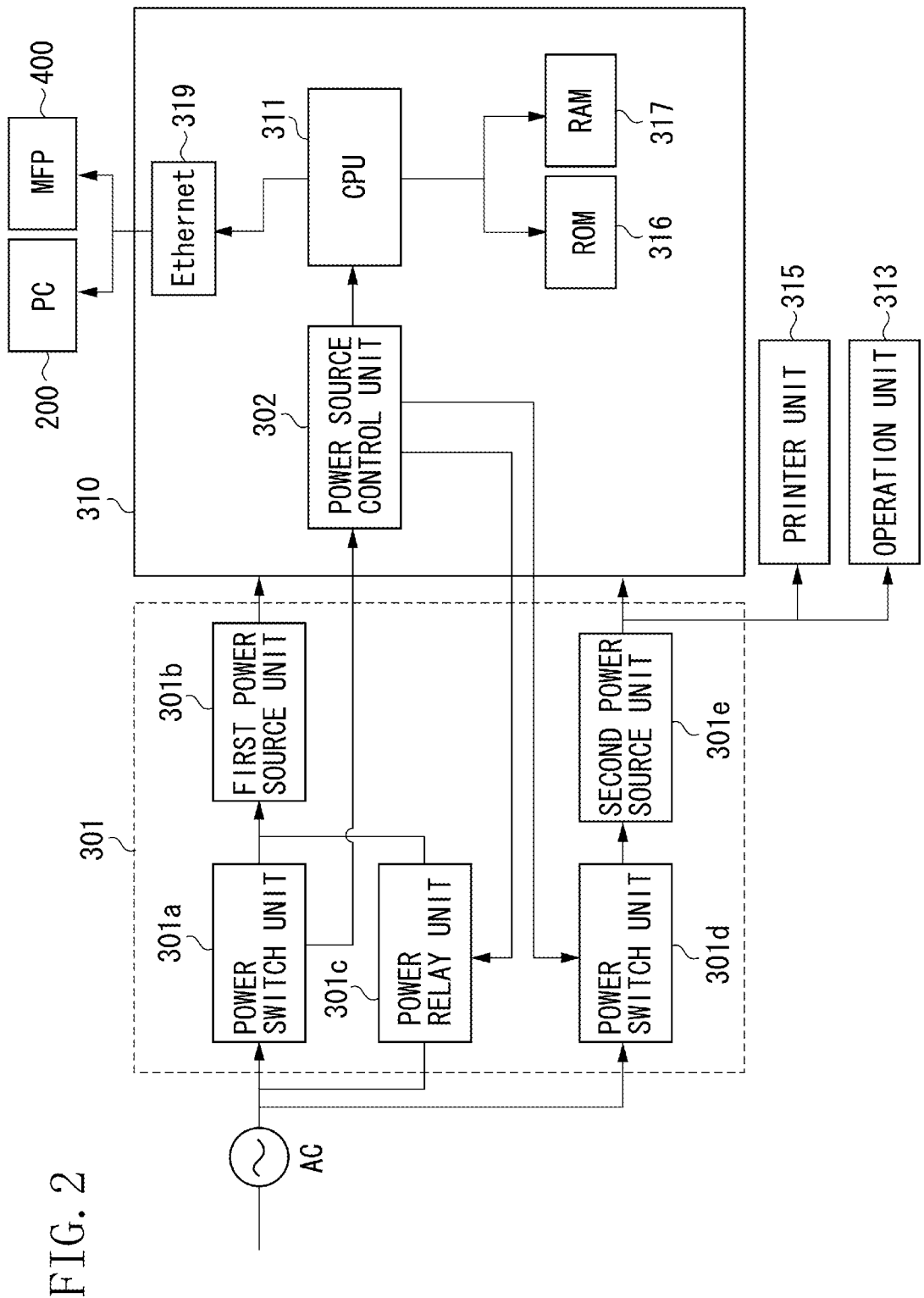
FIG. 2 illustrates a configuration of a power switch and periphery of the power switch.

SFP 300 from the sleep state to the standby state, the power source control unit 302 transmits a resumption instruction to the power source unit 301 to resume supplying of power to the printer unit 315 and the operation unit 313. When a power switch unit 301a illustrated in FIG. 2 is turned ON by a user's operation, the power source control unit 302 returns the SFP 300 from the OFF-state to the standby state. Specifically, when the power switch unit 301a is turned ON, the power source control unit 302 receives a notification from the power switch unit 301a, and controls the power source unit 301 to supply power to the printer unit 315 and the operation unit 313.

The CPU 311 controls each unit of the SFP 300.

The display panel 312 displays various pieces of information of the SFP 300.

The operation unit 313 performs execution instruction of various programs according to a user's operation. The operation unit 313 receives various operations from an operator. Based on a user' operation received by the operation unit 313, the CPU 311 transmits screen data to be displayed to the display panel 312. The display panel 312 displays the received screen data on a screen. During sleep, a backlight of the display panel 312 is turned OFF. The CPU 311 starts the timer 320 according to an operation of the operation unit 313.

The printer unit 315 prints the input image data. The printer unit 315 carries out print processing under control of the CPU 311. During sleep, power supplying to the printer unit 315 is stopped.

The ROM 316 stores program codes for controlling the CPU 311, the display panel 312, the operation unit 313, and the printer unit 315. By employing a rewritable flash ROM as the ROM 316, the program codes stored in the ROM 316 can be updated. The RAM 317 is used as a work memory of the program codes. The RAM 317 temporarily stores an image to be printed by the printer unit 315.

The nonvolatile memory 318 temporarily stores the received Email and an image file attached to the Email. The nonvolatile memory 318 is configured with a hard disk (HDD) or a flash ROM. The nonvolatile memory 318 stores various software or data executed in the computer system. The nonvolatile memory 318 stores an operating system (OS) or various application programs (control programs) for executing information processing. The various control programs also include a control program concerning a shutdown function. The data includes auto sleep shifting time for executing auto sleep, auto shutdown shifting time for executing auto shutting-down, and weekly shutdown time for executing weekly shutting-down.

The Ethernet(registered trademark) I/F 319 for connection to the LAN 600 enables transmission and reception of the Email or the PDL data. The external I/F 322 is an interface with other external apparatuses.

The timer 320 is provided to count sleep shifting time or shutdown shifting time. The timer 320 starts counting by the CPU 311, and interrupts the CPU 311 if sleep shifting time or shutdown shifting time is counted.

Configuration of Power Switch and Periphery of Power Switch.

Next, referring to FIG. 2, the configuration of a power switch 321 and periphery of the power switch will be described.

The power source unit 301 rectifies and transforms power supplied from a commercial power supply AC to generate direct-current (DC) power (24 V, 3.3 V). The DC power generated by the power source unit 301 is supplied to the controller unit 310, the printer unit 315, and the operation unit 313. The controller unit 310 includes the CPU 311, the power source control unit 302, the ROM 316, and the RAM 317.

The power source unit 301 includes the power switch unit 301a, a first power source unit 301b, a power relay unit 301c, a power switch unit 301d, and a second power source unit 301e.

The power switch unit 301a is a solenoid switch. The solenoid switch, which includes a switch and an actuator, can manually or automatically turn OFF the switch. The actuator, which includes a solenoid and an iron core (arranged in the solenoid), can operate the iron core by supplying current to the solenoid, and automatically turn OFF the switch. The power switch unit 301a has a function of notifying the power source control unit 302 of its ON/OFF state.

The power relay unit 301c supplies, based on a signal from the power source control unit 302, alternating-current (AC) power from external to the first power source unit 301b even in an OFF-state of the power switch unit 301a. The power source control unit 302 turns OFF the power relay unit 301c to stop supplying of the power from the AC power source to the first power source unit 301b.

The first power source unit 301b converts the AC power from external into DC power. The first power source unit 301b supplies the DC power of 3.3 V to the controller unit 310. 3.3 V is only an example, and thus a voltage is not limited to 3.3 V as long as it can drive the controller unit 310.

The power switch unit 301d is provided between the AC power source from external and the second power source unit 301e. The power switch unit 301d is switched between ON and OFF according to a switch driving signal transmitted from the power source control unit 302. The power switch unit 301d is turned OFF in a sleep state and an OFF-state, and turned ON in a standby state.

The second power source unit 301e supplies the DC power of 24 V to the controller unit 310, the printer unit 315, and the operation unit 313. 24 V is only an example, and thus a voltage is not limited to 24 V as long as it can drive the controller unit 310, the printer unit 315, and the operation unit 313.

Power State of SFP 300

The SFP 300 is set in one of power states of standby state, a sleep state, and an OFF-state. As in the case of the SFP 300, the MFP 200 is set in one of a standby state, a sleep state, and an OFF-state. In the present exemplary embodiment, a power state of the MFP 200 is similar to that of the SFP 300, and thus description thereof will be omitted.

The power source unit 301 includes the first power source unit 301b that continuously supplies power to the SFP 300 when the SFP 300 shifts to the sleep state, and the second power source unit 301e that cuts off supplying of power when the SFP 300 shifts to the sleep state.

In the standby state of the SFP 300, the power switch unit 301a, the power relay unit 301c, and the power switch unit 301d are all turned ON. Accordingly, power is supplied from the first power source unit 301b and the second power source unit 301e to each unit of the SFP 300. In other words, in the standby state, power is supplied from both the first power source unit 301b and the second power source unit 301e to each device of the SFP 300.

On the other hand, in the sleep state, the power switch unit 301a and the power relay unit 301c are turned ON while the power switch unit 301d is turned OFF. Accordingly, power is supplied from the first power source unit 301b to the controller unit 310 while power supplied from the second power source unit 301e to each device is cut off.

In the OFF-state of the SFP 300, the power switch unit 301a, the power relay unit 301c, and the power switch unit 301d of the power source unit 301 are all turned OFF. Accordingly, power supplied from the first power source unit 301b and the second power source unit 301e to each unit of the SFP 300 is stopped.

If the CPU 311 detects a factor causing a transition to the sleep state in the standby state of the SFP 300, the CPU 311 causes the power source control unit 302 to transmit a switch-OFF command to the power switch unit 301d. Accordingly, the power switch unit 301d is turned OFF to cut off power supplied from the second power source unit 301e to the printer unit 315 or the like.

The factors causing a transition to the sleep state are: (factor 1) the operation unit 313 is not operated for sleep shifting time (e.g., 1 minute) set by the operation unit 313; and (factor 2) a sleep shifting button (not illustrated) provided in the operation unit 313 is pressed. In the present exemplary embodiment, the factors 1 and 2 are cited as the factors causing a transition to the sleep state. However, the present invention is not limited to these. When factors other than the factors 1 and 2 are satisfied, the SFP 300 may be shifted to the sleep state.

Figure 3A:
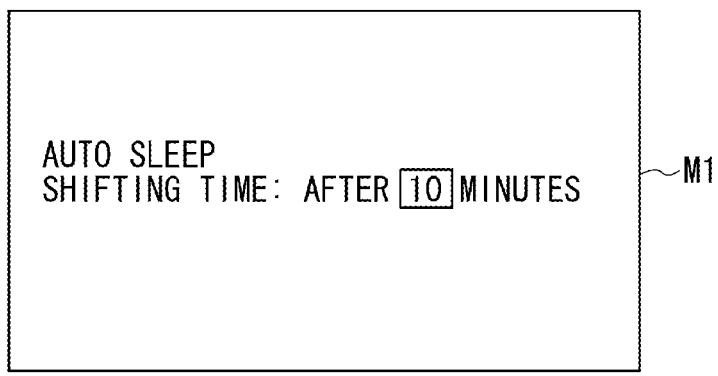
FIGS. 3A, 3B, 3C and 3D illustrate contents displayed on a display panel of a single function peripheral (SFP).

The auto sleep shifting time can be arbitrarily set by the user via a screen M1 displayed on the display panel 312 of the SFP 300, as illustrated in FIG. 3A. Since power supplying from the second power source unit 301e of the power source unit 301 to the CPU 311 is cut off, the CPU 311 collects and stores register setting values in the RAM 317 before the SFP 300 shifts to the sleep state, and then cuts off the second power source unit 301e. Accordingly, by shifting the SFP 300 to the sleep state, power consumption of the SFP 300 can be reduced more than in the standby state.

The power source control unit 302 instructs the power source unit 301 to supply power from the second power source unit 301e based on a sleep return factor. Accordingly, the SFP 300 shifts from the sleep state to the standby state. The sleep recovery factor is one of: (return factor 1) a sleep return button (not illustrated) provided in the operation unit 313 is pressed, and (return factor 2) the Ethernet(registered trademark) I/F 319 receives a printing request from the PC 400. In the present exemplary embodiment, the return factors 1 and 2 are cited as the examples of the sleep return requirements. However, the present invention is not limited to these. When requirements other than the return factors 1 and 2 are satisfied, the SFP 300 may be returned from the sleep state to the standby state.

When the sleep state returns to the standby state, the CPU 311 receives power from the second power source unit 301e of the power source unit 301 to be activated. In this case, the CPU 311 reads the register setting values stored in the RAM 317 during shifting from the sleep state to the standby state, and sets the SFP 300 to the same state as that before the shifting to the sleep state.

Shutdown Function

Next, the auto shutdown function and the weekly shutdown function of the SFP 300 will be described.

First, the auto shutdown function will be described. This auto shutdown function is for automatically cutting off power supplied to each device of the SFP 300 from the power source unit 301 if the CPU 311 detects an auto-OFF factor. When the auto shutdown function is executed, the power of the SFP 300 is set to an OFF-state, thus enabling power consumption of the SFP 300 to be reduced more than in the sleep state. When the power state of the SFP 300 becomes OFF-state by the auto shutdown function, receiving Email from the MFP 200, receiving a printing request from the PC 400, and receiving a user's operation from the operation unit 313 become impossible. In the present exemplary embodiment, the expression of "OFF-state" is used. Strictly, however, the power consumption of the SFP 300 does not need to be exactly 0 watt. In the present exemplary embodiment, the state where power supply from the power source unit 301 is stopped is an OFF-state, disabling reception of any Email transmitted from the MFP 200.

Figure 3B:
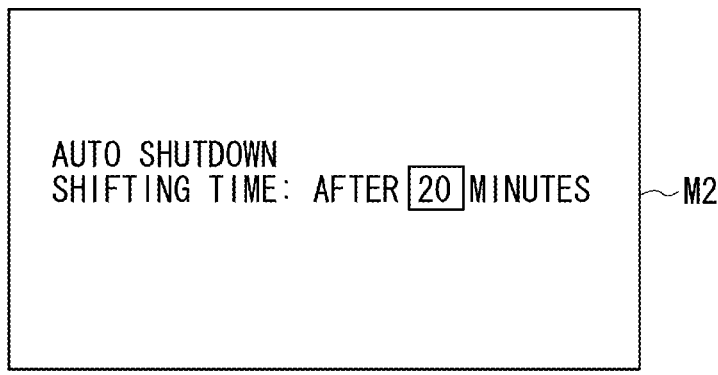

The factor (auto-OFF factor) for executing the auto shutdown function is one of the followings: (auto-OFF factor 1) the operation unit 313 has not been operated for auto shutdown shifting time (e.g., 20 minutes) after the SFP 300 shifted to the sleep state, and (auto-OFF factor 2) the Ethernet(registered trademark) I/F 319 has not received any printing request from the PC 400 for auto shutdown shifting time (e.g., 20 minutes) after the SFP 300 shifted to the sleep state. The auto shutdown shifting time can be arbitrarily set by operating the operation unit 313 via a screen M2 displayed on the display panel 312, as illustrated in FIG. 3B.

Next, the weekly shutdown function will be described. This weekly shutdown function is for automatically cutting off power supplied to the SFP 300 from the power source unit 301 when time measured by the timer 320 reaches the time (weekly shutdown time) preset by the user. Accordingly, the power of the SFP 300 is set to an OFF-state, thus enabling power consumption of the SFP 300 to be reduced more than in the sleep state. When the power state of the SFP 300 becomes OFF-state by the weekly shutdown function, receiving Email from an external apparatus, or receiving a printing request become impossible. In the power-OFF state of the SFP 300, receiving a user's operation from the operation unit 313 becomes impossible. The weekly shutdown function is mainly used to suppress wasteful power consumption when nobody uses the image forming apparatus in an office after work.

Figure 3C:
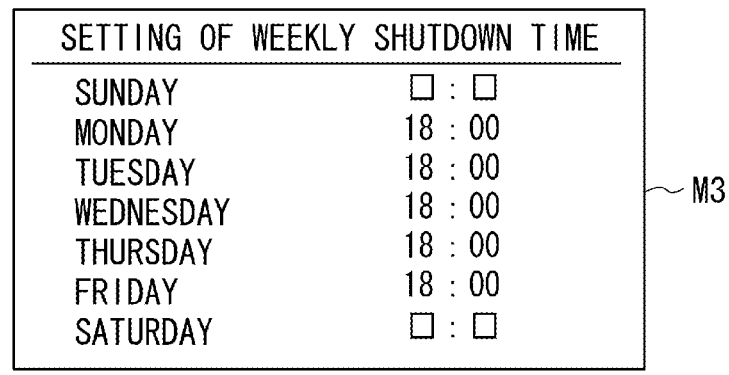

The weekly shutdown time is, as illustrated in FIG. 3C, set for each day by the user via a screen M3 displayed on the display panel 312. In the example illustrated in FIG. 3C, shutdown time is set to 18:00 from Monday to Friday, while no time is set for Saturday and Sunday.

The shutdown functions (auto shutdown function and weekly shutdown function) of the SFP 300 have been described. Shutdown functions (auto shutdown function and weekly shutdown function) of the MFP 200 are similar to those of the SFP 300, and thus description thereof will be omitted.

Transfer Method of FAX Data

FIG. 4 illustrates a transfer setting table 230 stored in the nonvolatile memory 218 of t he MFP 200. The MFP 200 communicably connected to the SFP 300 transfers FAX data transmitted from the FAX 100 to the SFP 300. If the MFP 200 transfers the FAX data to the SFP 300, the MFP 200 transmits Email with the FAX data as an attached file to the SFP 300.

The MFP 200 refers to the transfer setting table 230 to determine a transfer destination of the FAX data received from the FAX 100. The transfer setting table 230 includes a FAX number, a transfer destination IP address, and a number of transfer retrying times. The MFP 200 has a pluralities of FAX lines and FAX numbers, and can set one transfer destination for one FAX number. Upon receiving FAX data addressed to a specific FAX number (e.g., "012-345-6789"), the MFP 200 transmits E mail attached with the FAX data to the SFP 300 indicated by a transfer destination IP address (e.g., "111.222.333.444") corresponding to the FAX number. If a session is not connected during transmission of the Email attached with the FAX data to the SFP 300, the MFP 200 tries transmission of the Email again after the passage of waiting time (30 seconds in the example illustrated in FIG. 4) set in the number of transfer retrying times. If a setting value (e.g., "5 times" illustrated in FIG. 4) of the number of transfer retrying time is exceeded, the MFP 200 cancels the transmission of the Email to the SFP 300, and prints the FAX data. The transfer setting table 230 can be edited by using the operation unit 213.

Email Transmitted to SFP 300 From MFP 200

Next, referring to FIG. 5, data of the Email transmitted to the SFP 300 from the MFP 200 will be described. FIG. 5 illustrates data of the Email attached with an image file. This data includes a mail header 700 describing various pieces of information, a mail message document 701, an attached image file 702, and an image file 703.

The mail header 700 includes a "Date" field for setting transmission date information, a "From" field for setting a transmitter's mail address, and a "To" field for setting a receiver's mail address. The mail header 700 further includes a "Subject" field for setting a title of Email, and a "Message" field for setting a unique identification (ID) generated based on a transmission data or a mail address of a device to identify the Email. A field for indicating transfer from the FAX 100 during transmission of FAX data from the FAX 100 is added to the mail header 700. In the case illustrated in FIG. 5, a "X-Canon-Fax" field is added to the mail header 700. This indicates that a transmission source of the FAX data attached to the Email is the FAX 100. The Email must be 7-bit code readable information. Thus, the Email cannot be directly transmitted if the attached image file is binary data. Thus, the mail message document 701 and the attached image files 702 and 703 are performed data conversion into a multipurpose Internet mail extension (MIME) form to be transmitted. The mail header 700 includes a "MIME-Version" field for setting a MIME version. Each data attribute is set in a "Content-Type" field of each of the mail message document 701 and the attached image files 702 and 703. A data encoding scheme is set in a "Content-Transfer-Encoding" field.

The mail message document 701 is configured with text data of a "ISO-2022-JP" language system.

The image file 702 is configured with image data of a tagged image file format (TIFF) of a coding method referred to as "base 64", in the example. The image file 703 is configured with image data of a joint photographic experts group (JPEG) of the coding method referred to as "base 64", in the example.

In the present exemplary embodiment, the two image files 702 and 703 are attached to the Email. However, there are no restrictions on the number of image files attached to the Email or a compression format of the image file. For example, in addition to the image files of TIFF and JPEG, a portable document format (PDF) file may be attached to the E mail.

Printing Result of Email

FIG. 6 illustrates a printing result of the mail message document and the image file attached to the Email. The printer unit 315 of the SFP 300 prints the mail message document 701 on a first page, and the image file 702 and the image file 703 one by one on second pages and after. In the case of the TIFF format, a multipage configuration storing a plurality of images in one file can be employed. Accordingly, images of a plurality of pages can be printed by attaching one image file of a TIFF format to the E mail and transmitting it. Further, if the field ("X-Canon-Fax") indicating the transfer printing from the FAX 100 illustrated in FIG. 5 is not added (transmission source of the Email is not the FAX 100), the mail message document 701 and the image files 702 and 703 are printed. On the other hand, if the field ("X-Canon-Fax") is added, the image files 702 and 703 are printed while printing of the mail message document 701 is omitted. Based on presence/absence of the field ("X-Canon-Fax"), the SFP 300 can determines whether to omit printing of the mail text 701 not present during image data transmission from the FAX 100 to the MFP 200.

Operations of FAX 100, MFP 200, and SFP 300

Figure 7:
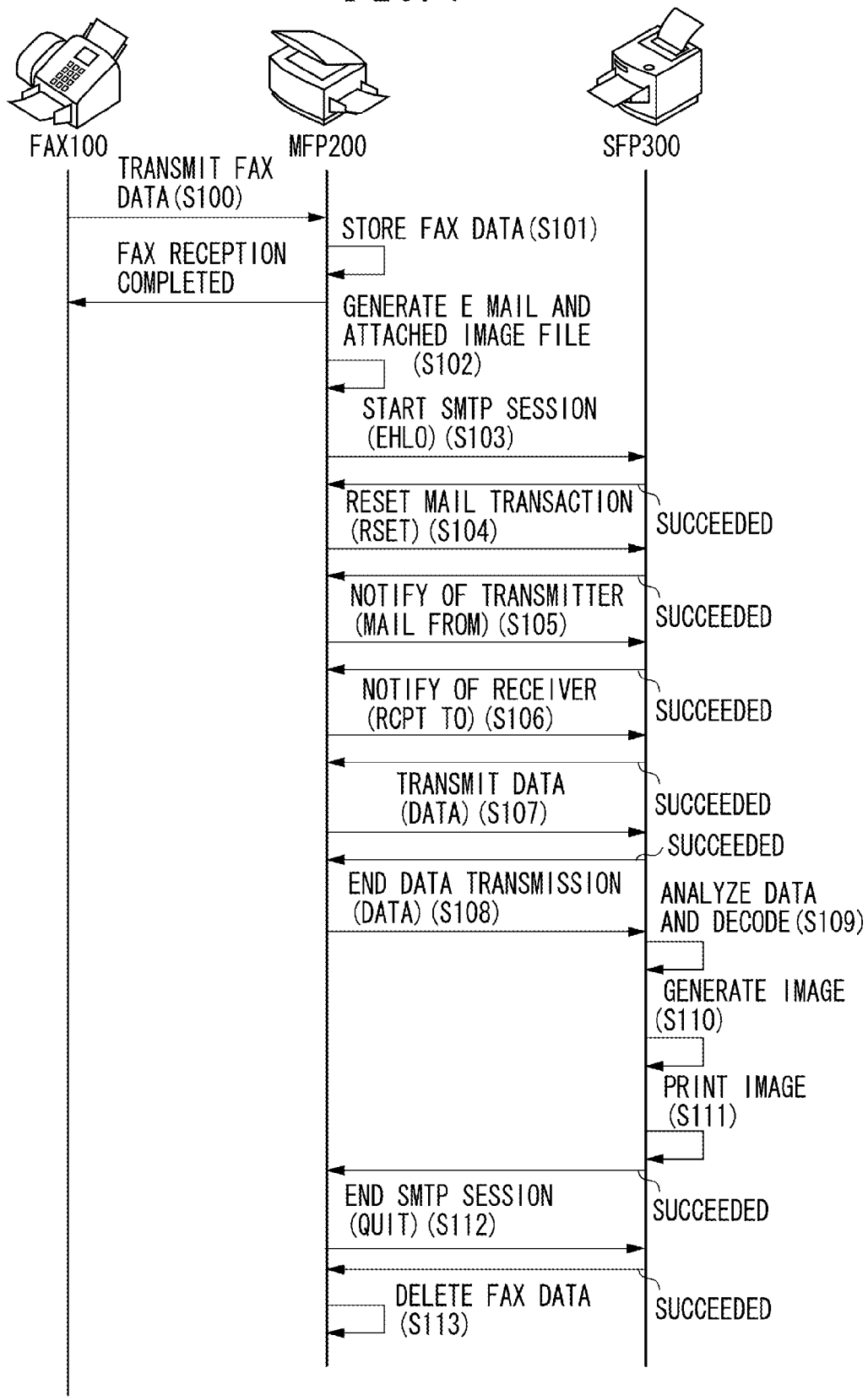
FIG. 7 illustrates a processing sequence among a FAX, the MFP, and the SFP.

FIG. 7 is a sequential diagram illustrating operations of the FAX 100, the MFP 200, and the SFP 300.

First, in step S100, the FAX 100 transmits FAX data to the MFP 200.

In step S101, the MFP 200 receives the FAX data transmitted from the FAX 100, and temporarily stores the FAX data in the nonvolatile memory 218. The MFP 200 then notifies the FAX 100 of completion of reception of the FAX data.

The MFP 200, which has stored the FAX data in the nonvolatile memory 218, transfers the FAX data to the SFP 300. Specifically, in step S102, the MFP 200 generates Email to be transmitted to the SFP 300 and an image file to be attached to the Email. The image file, which is generated from the FAX data stored in the nonvolatile memory 218, is an image file of a TIFF or JPEG format.

Then, in step S103, the MFP 200 notifies of a start of a SMTP session. In step S104, the MFP 200 resets a setting value set in a last mail transaction. In step S105, the MFP 200 notifies of an E mail transmitter (mail address). In step S106, the MFP 200 notifies of an E mail receiver. In step S107, the MFP 200 transmits the Email attached with the image file. In step S108, the MFP 200 notifies of an end of transmission of the Email attached with the image file. The Email is transmitted by using a SMTP command.

In step S109, the SFP 300, which has received the Email attached with the image file, analyzes data of the Email and the image file. Specifically, the SFP 300 restores the mail text 701, the image file 702, and the image file 703 by data analysis and code restoration of the MIME format. In step S110, the SFP 300 generates an image for printing by using the mail text 701, the image file 702, and the image file 703 that have been restored. In step S111, the SFP 300 prints the generated image. After completion of printing of all pages, the SFP 300 returns a notification of success to the command indicating the end of data transmission in step S108, thereby notifying of printing completion. In step S112, the SFP 300 notifies of an end of the SMTP session.

Then, in step S113, the MFP 200, which has received the notification of success, deletes the FAX data temporarily stored in the nonvolatile memory 218 in the MFP 200.

Setting Method of Shutdown function

In the SFP 300 according to the first exemplary embodiment, if setting (E mail receiving function) of the SMTP is changed from invalid to valid, setting of the shutdown functions (auto shutdown function and weekly shutdown function) is made invalid in association.

If setting of SMTP of the SFP 300 is changed from valid to invalid, the shutdown functions are not associated in the setting.

Figure 8:
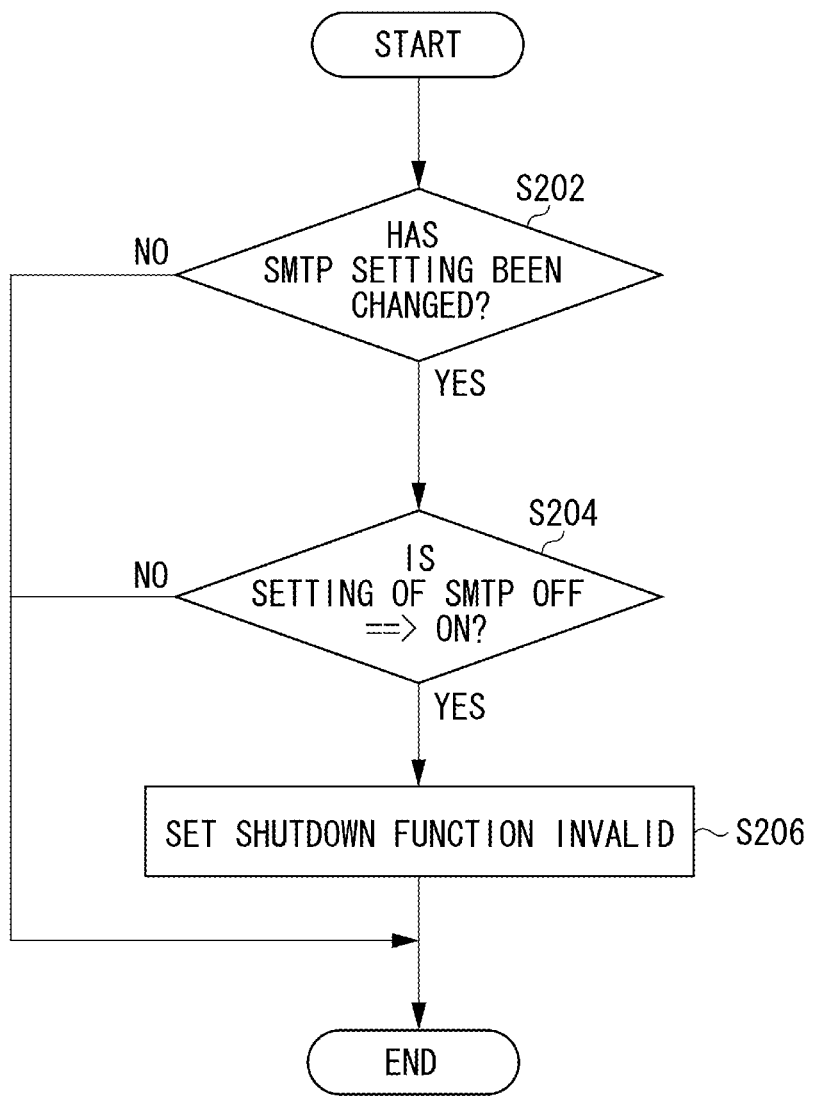
FIG. 8 is a flowchart illustrating processing for changing setting of a shutdown function of the SFP.

FIG. 8 is a flowchart illustrating processing for changing setting of SMTP of the SFP 300.

Figure 3D:
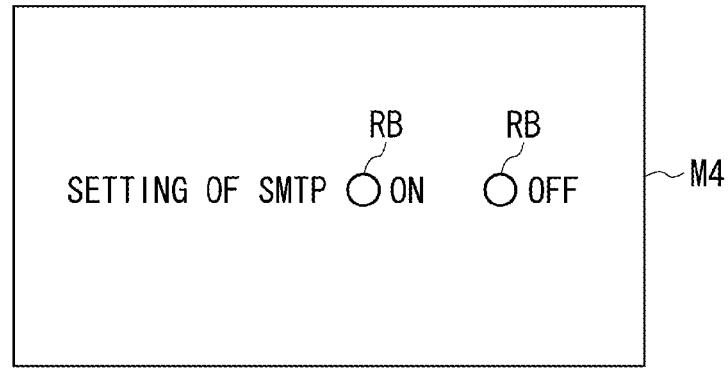

First, in step S202, the CPU 311 determines whether setting of SMTP has been changed. As illustrated in FIG. 3D, the setting of the SMTP is set by a radio button RB of the display panel 312 of the SFP 300. If it is determined that the setting of SMTP has not been changed (NO in step S202), the CPU 311 ends the sequence. On the other hand, if it is determined that the setting of SMTP has been changed (YES in step S202), in step S204, the CPU 311 determines whether the changed setting of the SMTP has been changed from invalid to valid. If it is determined that the setting of the SMTP has been changed from invalid to valid (YES in step S204), in step S206, the CPU 311 sets the shutdown function invalid. Specifically, in a case where the setting of the SMTP has been changed from invalid to valid, if the shutdown function is invalid, the invalid state is maintained. If the shutdown function is valid, the setting is changed to invalid.

On the other hand, if it is determined that the setting of the SMTP has been changed from valid to invalid (NO in step S204), the CPU 311 ends the sequence without changing the setting of the shutdown function. If it is determined that the setting of the SMTP has been changed from valid to invalid (NO in step S204), the CPU 311 may change the shutdown function to valid. Specifically, in a case where the setting of the SMTP has been changed from valid to invalid, if the shutdown function is valid, the valid state is maintained. If the shutdown function is invalid, the setting may be changed to valid.

Execution of Auto Shutdown Function

Figure 9:
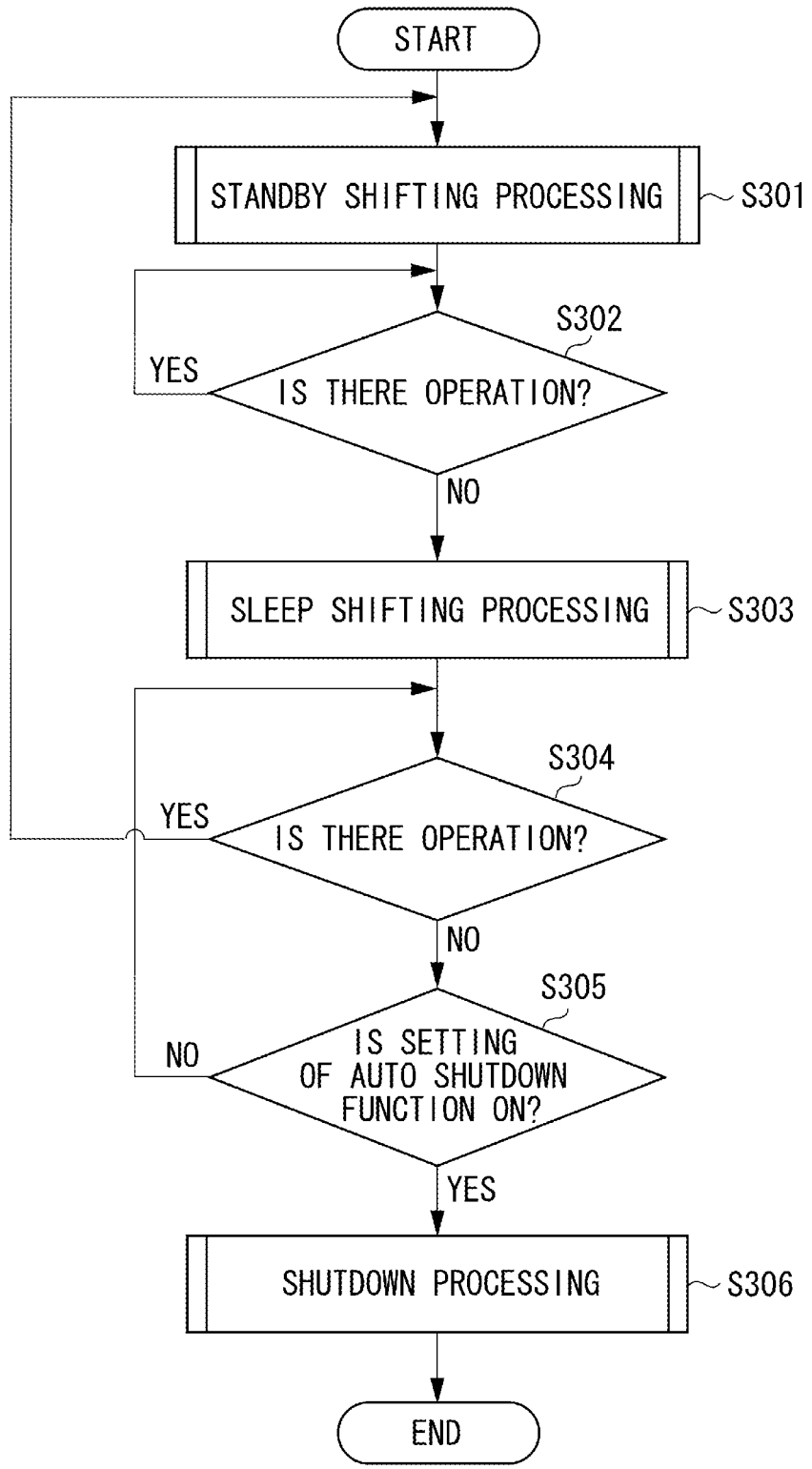
FIG. 9 is a flowchart illustrating an operation from activation of the SFP to shutting-down by an auto shutdown function.

Next, referring to FIG. 9, an operation of the SFP 300 from activation to shutting-down by the auto shutdown function will be described.

If the power switch unit 301a is turned ON by a user's operation, power is supplied to the SFP 300. If the power switch unit 301a is ON, power is supplied from the first power source unit 301b to the controller unit 310. Then, in step S301, the CPU 311 controls the power source control unit 302 to shift a power state of the SFP 300 to a standby state. Specifically, by turning ON the power switch unit 301d by the power source control unit 302, power is supplied from the second power source unit 301e to the controller unit 310, the printer unit 315, and the operation unit 213.

Then, if it is determined that the SFP 300 is in a standby state and the operation unit 300 has not been operated for a predetermined time (Ts1: auto sleep shifting time) or no start instruction (not receiving print data) has been issued from the PC 400 for a predetermined time (Ts1: auto sleep shifting time) (NO in step S302), in step S303, the CPU 311 shifts the SFP 300 to a sleep state. Specifically, by turning OFF the power switch unit 301d by the power source control unit 302, power supplying from the second power source unit 301e to the controller unit 310, the printer unit 315, and the operation unit 213 is stopped. The first power source unit 301b continuously supplies power to the controller unit 310.

Step S302 will be described in detail. In the present exemplary embodiment, the CPU 311 initializes (clears) a numerical value of standby state elapsed time (Tpnr) stored in the data region of the ROM 316 to "0". The CPU 311 updates (counts up) a numerical value of standby state passage time (Tpnr) stored in the data region of the ROM 104 while any signal is input from none of the operation unit 313, the Ethernet(registered trademark) I/F 319, and the external I/F 322. If the standby state elapsed time (Tpnr) is determined to be larger than the auto sleep shifting time (Ts1) (Tpnr>Ts1), in step S303, the CPU 311 executes sleep shifting processing.

On the other hand, if a signal is input from one of the operation unit 313, the Ethernet(registered trademark) I/F 319, and the external I/F 322 before the standby state elapsed time (Tpnr) passes the auto sleep shifting time (Ts1), the CPU 311 executes an operation according to the input signal. Then, the CPU 311 initializes the numerical value of Tpnr to "0" while maintaining the standby state of the SFP 300 (NO in step S302).

In step S303, the CPU 311 controls the power source control unit 302 to cut off power supplied from the second power source unit 301e to the operation unit 313 and the printer unit 315. In a case where the SFP 300 is in a sleep state, if the power source control unit 302 has not detected any sleep return factor for a predetermined time (Tsh: auto shutdown shifting time)(NO in step S302), the CPU 311 carries out determination of step S305. Specifically, if it is determined that the operation unit 313 has not been operated for a predetermined period of time (Tsh: auto shutdown shifting time) or no start instruction has been issued from an external device such as the PC 400 or the MFP 200 for a predetermined period of time (Tsh: auto shutdown shifting time) (NO in step S304), the CPU 311 carries out determination of step S305. In step S305, the CPU 311 determines whether the setting of the auto shutdown function is ON.

Step S304 will be described in detail. In the present exemplary embodiment, the CPU 311 initializes (clears) a numerical value of sleep state passage time (Tps1) stored in the data region of the ROM 316 to "0". The CPU 311 updates (counts up) a numerical value of standby state elapsed time (Tps1) stored in the data region of the ROM 104 while any signal is input from none of the operation unit 313, the Ethernet(registered trademark) I/F 319, and the external I/F 322. If the sleep state elapsed time (Tps1) is determined to be larger than the auto shutdown shifting time (Tsh) (Tps1>Tsh), in step S305, the CPU 311 determines whether the setting of the auto shutdown function is ON.

If it is determined that the setting of the auto shutdown function is ON (YES in step S305), in step S306, the CPU 311 executes shutdown processing of shifting the SFP 300 to an OFF-state (energy-saving state). On the other hand, in a case where the setting of the auto shutdown function is not ON (namely the setting is OFF) (NO in step S305), the CPU 311 maintains the SFP 300 in the sleep state without executing shutdown processing.

On the other hand, if a signal is input from one of the operation unit 313, the Ethernet I/F 319, and the external I/F 322 before the sleep state passage time (Tps1) passes the auto sleep shifting time (Tsh) (YES in step S304), the CPU 311 executes processing of step S301. In step S301, the CPU 311 executes standby state shifting processing to shift the SFP 300 to the standby state.

Execution of Weekly Shutdown Function

Figure 10:
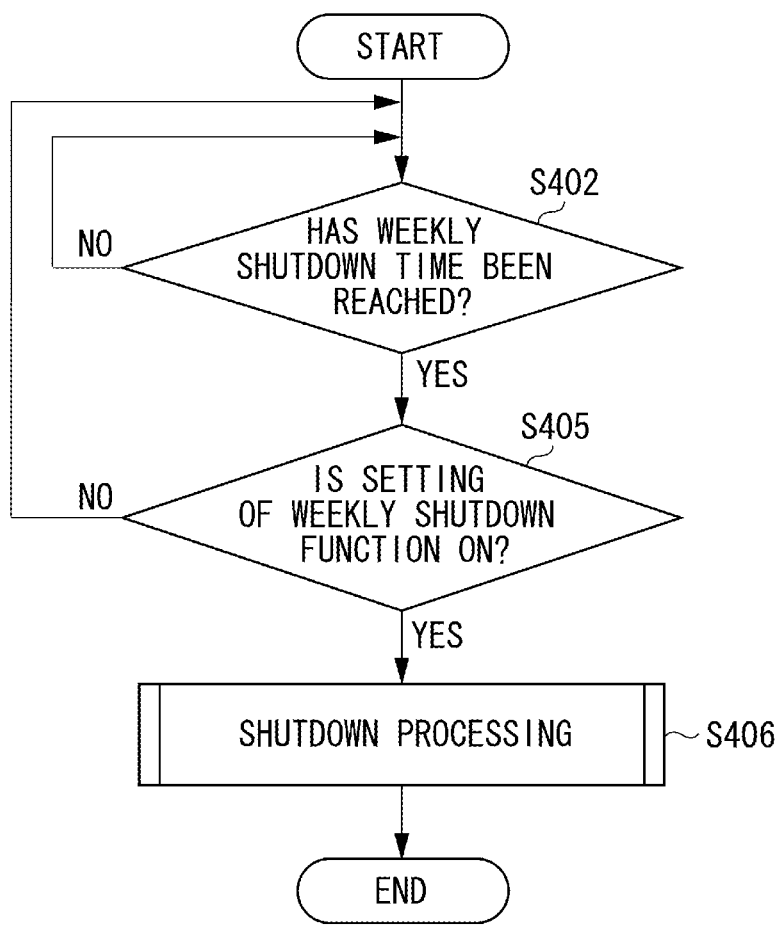
FIG. 10 is a flowchart illustrating an operation from the activation of the SFP to shutting-down by a weekly shutdown function.

Next, referring to FIG. 10, an operation of the SFP 300 until being shut down by the weekly shutdown function will be described.

In step S402, in the standby state or the sleep state of the SFP 300, the CPU 311 determines whether time measured by the timer 320 has reached weekly shutdown time. Specifically, the CPU 311 obtains the time measured by the timer 320, and compares the current time with the weekly shutdown time stored in the ROM 316. Thus, if it is determined that the current time has reached the weekly shutdown time (YES in step S402), in step S405, the CPU 311 determines whether setting of the weekly shutdown function is ON. If it is determined that the setting of the weekly shutdown function is ON (YES in step S405), in step S406, the CPU 311 executes shutdown processing of shifting the SFP 300 to an OFF-state (energy-saving state). On the other hand, if it is determined that the setting of the weekly shutdown function is not ON (namely the setting is OFF) (NO in step S405), the CPU 311 does not execute shutdown processing. Thus, the power state of the SFP 300 is maintained in the standby state or the sleep state.

A second exemplary embodiment will be described.

The first exemplary embodiment has been described by taking the example of associating the setting of the shutdown function of the SFP 300 with the setting of the SMTP of the SFP 300. However, the present invention is not limited to this example. In the second exemplary embodiment, if the SFP 300 is registered as a transmission destination of FAX data transmitted from the MFP 200, setting of the shutdown function of the SFP 300 is made invalid.

Figure 11:
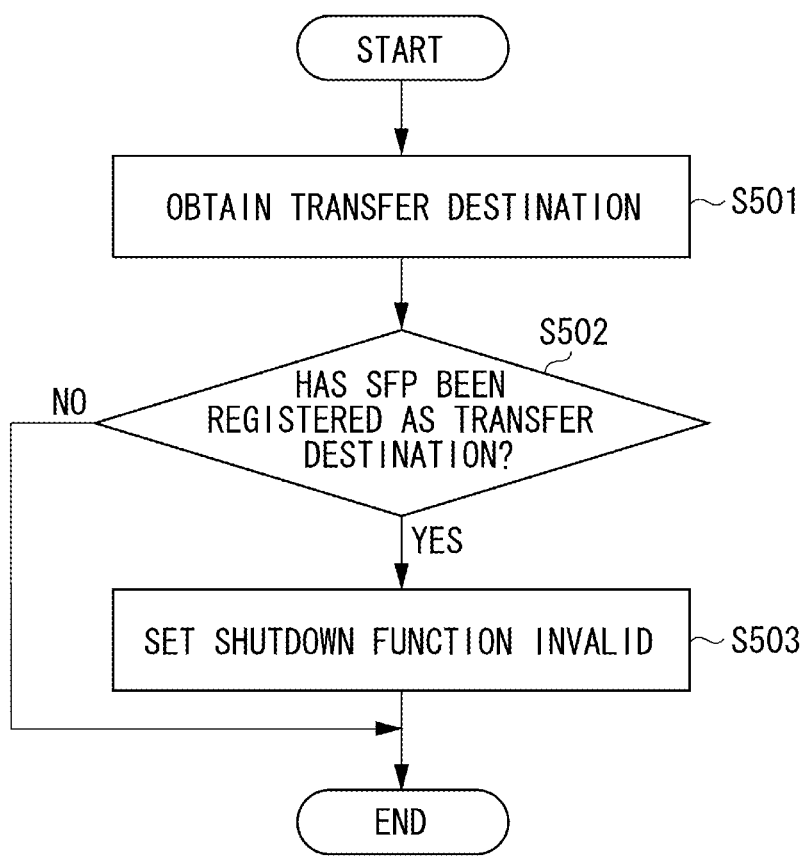
FIG. 11 is a flowchart illustrating processing for changing setting of a shutdown function of a SFP according to a second exemplary embodiment of the present invention.

FIG. 11 is a flowchart illustrating processing when the SFP 300 obtains transmission destination of FAX data transmitted from the MFP 200. In the present exemplary embodiment, if the SFP 300 is registered as a transmission destination of FAX data transmitted from the MFP 200, the CPU 311 sets the setting of the shutdown function invalid.

If the SFP 300 is not registered as a transmission destination of FAX data transmitted from the MFP 200, the setting of the shutdown function is not changed.

First, in step S501, the CPU 311 obtains a transfer destination of the FAX data of the MFP 200. The transfer destination of the FAX data of the MFP 200 is information of the transfer setting table or the like. In step S502, the CPU 311 determines whether the SFP 300 has been registered as a transfer destination of the FAX data. If it is determined that the SFP 300 has not been registered as a transfer destination of the FAX data (NO in step S502), the CPU 311 ends the sequence.

On the other hand, if it is determined that the SFP 300 has been registered as a transfer destination of the FAX data (YES in step S502), in step S503, the CPU 311 sets the setting of the shutdown function invalid. Specifically, in a case where it is determined that the SFP 300 has been registered as a transfer destination of the FAX data (YES in step S502), if the shutdown function is invalid, the invalid state is maintained. If the shutdown function is valid, the setting is changed to invalid.

Information about whether the SFP 300 has been registered as a transfer destination of the FAX data may be information obtained by making an inquiry to the MFP 200 by the CPU 311 or information input by the user operating the operation unit 313.

Modified Example

The first exemplary embodiment has been described by taking the example of setting the shutdown function invalid if the setting of the SMTP is valid, and the second exemplary embodiment has been described by taking the example of setting the shutdown function invalid if the SFP 300 has been registered as the transfer destination of the Email. However, the present invention is not limited to these. The second exemplary embodiment has been described by taking the example of using the transfer destination of the Email as an example of information of the MFP 200 that is the transmission source of the Email. However, the shutdown function may be set invalid based on information other than the transfer destination of the Email. For example, the SFP 300 may obtain a communication state with the MFP 200, and may set the shutdown function invalid if communication with the MFP 200 has been established. The SFP 300 may obtain setting information of the shutdown function of the MFP 200, and may set the shutdown function invalid based on the setting information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-113474 filed May 17, 2012, which is hereby incorporated by reference herein in its entirety.

What is claimed is:

1. An image forming apparatus capable of communicating with an external apparatus, the image forming apparatus comprising:
    a reception unit configured to receive Email transmitted from the external apparatus;
    a first setting unit configured to set a reception function of the Email to valid or invalid;
    a printing unit configured to print the Email transmitted from the external apparatus in a case where the reception function has been set to valid by the first setting unit;
    a second setting unit configured to set an auto shutdown function for shutting down the image forming apparatus to valid or invalid;
    an auto shutdown unit configured to execute shutdown processing of the image forming apparatus in a case where the auto shutdown function has been set to valid by the second setting unit; and
    a control unit configured to set the auto shutdown unit to control the second setting unit to set the auto shutdown function to invalid in a case where the reception function of the Email is set to valid by the first setting unit when the auto shutdown function has been set to valid by the second setting unit.

2. The image forming apparatus according to claim 1, wherein the first setting unit sets an SMTP to valid or invalid as the reception function of the Email.

3. The image forming apparatus according to claim 1, further comprising a timer configured to measure time, wherein, in a case where time measured by the timer has reached preset time and the auto shutdown function has been set to valid by the second setting unit, the auto shutdown unit executes the shutdown processing of the image forming apparatus.

4. The image forming apparatus according to claim 1, further comprising a receiving unit configured to receive an input from external, wherein in a case where the receiving unit has received no input from the external apparatus for a predetermined time and the auto shutdown function has been set to valid by the second setting unit, the auto shutdown unit executes the shutdown processing of the image forming apparatus.

5. The image forming apparatus according to claim 1, wherein the printing unit prints image data attached to the Email received by the reception unit.

6. The image forming apparatus according to claim 5, wherein the image data attached to the Email is FAX data.

7. The image forming apparatus according to claim 6, wherein the Fax data is FAX data received by the external apparatus from a FAX apparatus.

8. The image forming apparatus according to claim 1, wherein the first setting unit sets the reception function of the Email to valid or invalid by a user operation.

9. The image forming apparatus according to claim 1, wherein the second setting unit sets the auto shutdown function to valid or invalid by a user operation.

10. The image forming apparatus according to claim 1, wherein the shutdown processing of the image forming apparatus includes turn-off processing for turning off the image forming apparatus.

11. The image forming apparatus according to claim 1, wherein the printing unit does not print the Email transmitted from the external apparatus in a case where the reception function has been set to invalid by the first setting unit.

12. The image forming apparatus according to claim 1, wherein the auto shutdown unit does not execute the shutdown processing in a case where the auto shutdown function has been set to invalid by the second setting unit.

13. The image forming apparatus according to claim 1, further comprising: a transmitting unit configured to transmit a specific command after the printing unit has printed the Email transmitted from the external apparatus, wherein the external apparatus deletes the Email stored in the external apparatus in accordance with receiving the specific command.

14. A method for controlling an image forming apparatus capable of communicating with an external apparatus, the method comprising:
    receiving Email transmitted from the external apparatus;
    setting a reception function of the Email to valid or invalid;
    printing the Email transmitted from the external apparatus in a case where the reception function has been set to valid; and
    setting an auto shutdown function for automatically shutting down the image forming apparatus to valid or invalid;
    executing shutdown processing of the image forming apparatus in a case where the auto shutdown function has been set to valid; and
    setting the auto shutdown function to invalid in a case where the reception function of the Email is set to valid when the auto shutdown function has been set to valid.

15. A non-transitory computer-readable storage medium storing a program for causing a computer to execute the method for controlling the image forming apparatus according to claim 14.

* * * * *